United States Patent [19]
Stretton et al.

[11] 3,781,991
[45] Jan. 1, 1974

[54] BRUSH CUTTER

[75] Inventors: Joseph Blake Stretton, Wilton; William Borachok, Byram, both of Conn.

[73] Assignee: Textron, Inc., Providence, R.I.

[22] Filed: Sept. 17, 1971

[21] Appl. No.: 181,322

[52] U.S. Cl. .................... 30/276, 30/347, 56/295
[51] Int. Cl. .................... B26b 25/00, A01d 55/18
[58] Field of Search .................... 30/167, 276, 287, 30/296, 347, 388; 56/289, 295; 144/218

[56] References Cited
UNITED STATES PATENTS

| | | | |
|---|---|---|---|
| 2,427,265 | 9/1947 | Dreischerf | 56/295 |
| 3,346,955 | 10/1967 | Beneke | 30/296 R X |
| 3,453,732 | 7/1969 | Wilkin | 30/296 R |
| 3,683,606 | 8/1972 | Staines | 56/295 |

*Primary Examiner*—Othell M. Simpson
*Assistant Examiner*—Gary L. Smith
*Attorney*—Robert E. Burns et al.

[57] ABSTRACT

A rotary brush cutter blade comprises a flat plate shaped to provide a relatively small number of blade portions, for example, from three to 10, radiating from a central hub portion. The blade portions are symmetrical and have bevelled cutting edges at both sides so that the blade is reversible. The cutting edges are bevelled downwardly so that the leading edges are in the plane of the upper face of the blade. The blade portions merge smoothly into the central hub portion to avoid stress concentrations and provide a strong structure.

8 Claims, 5 Drawing Figures

PATENTED JAN 1 1974 3,781,991
SHEET 1 OF 2
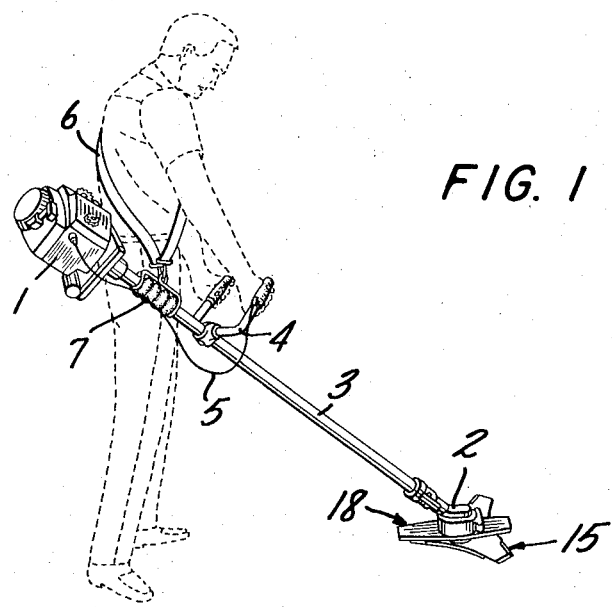
FIG. 1
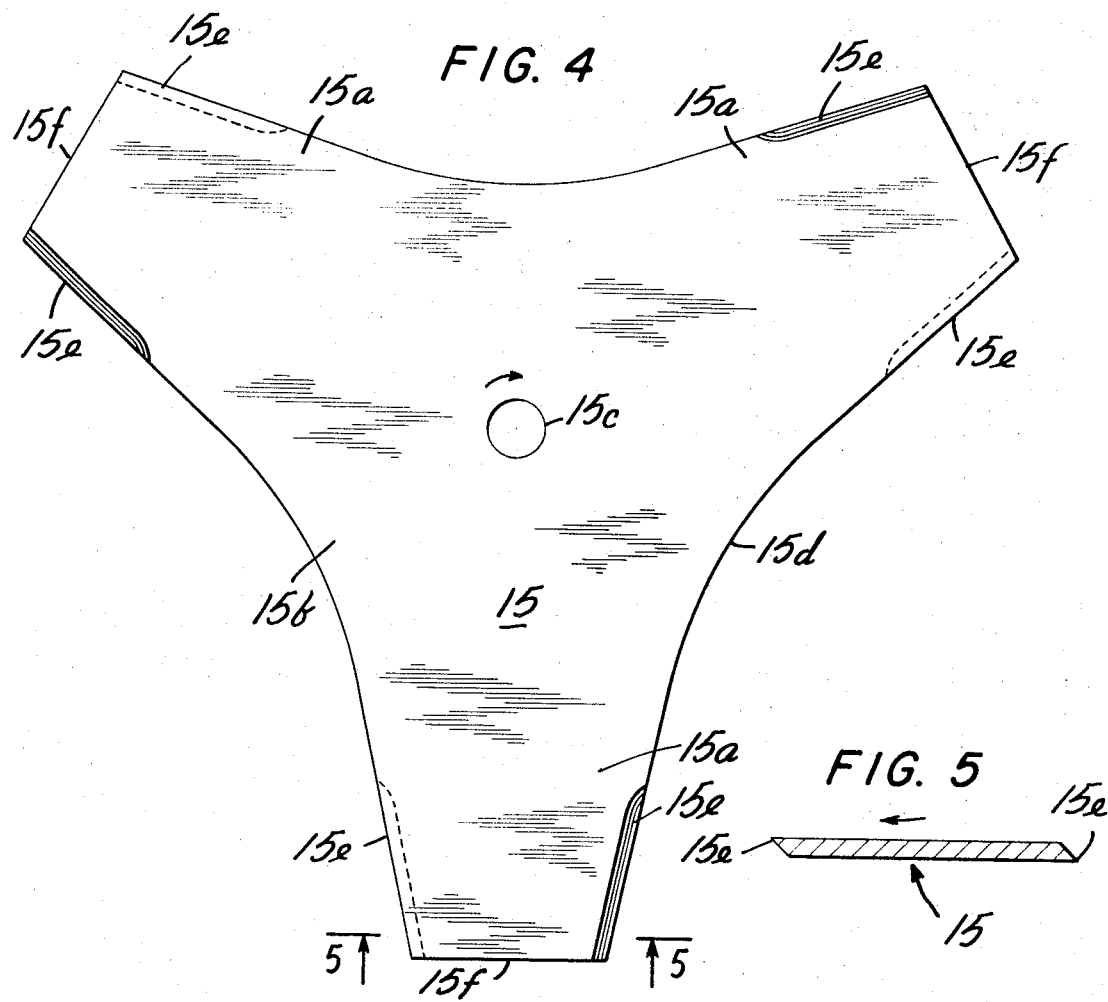
FIG. 4
FIG. 5

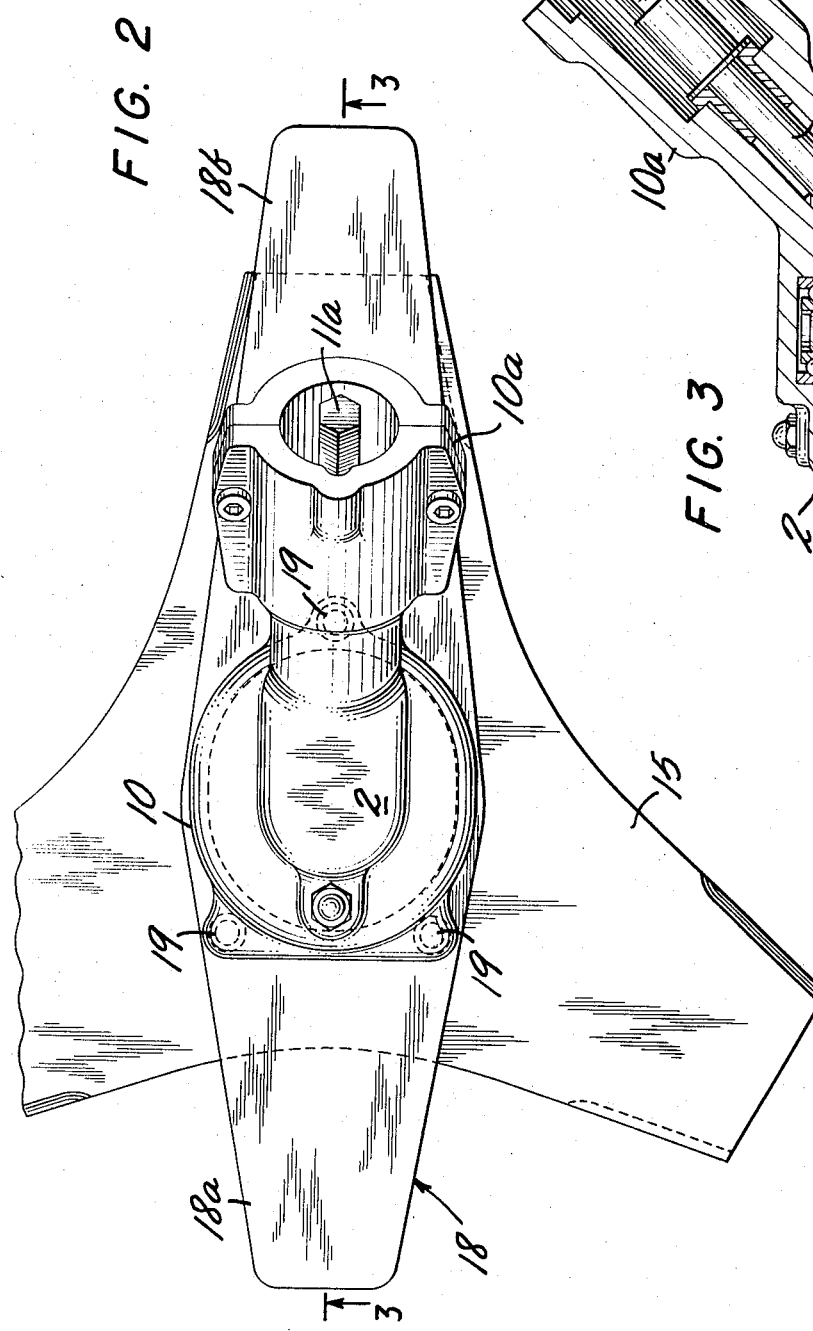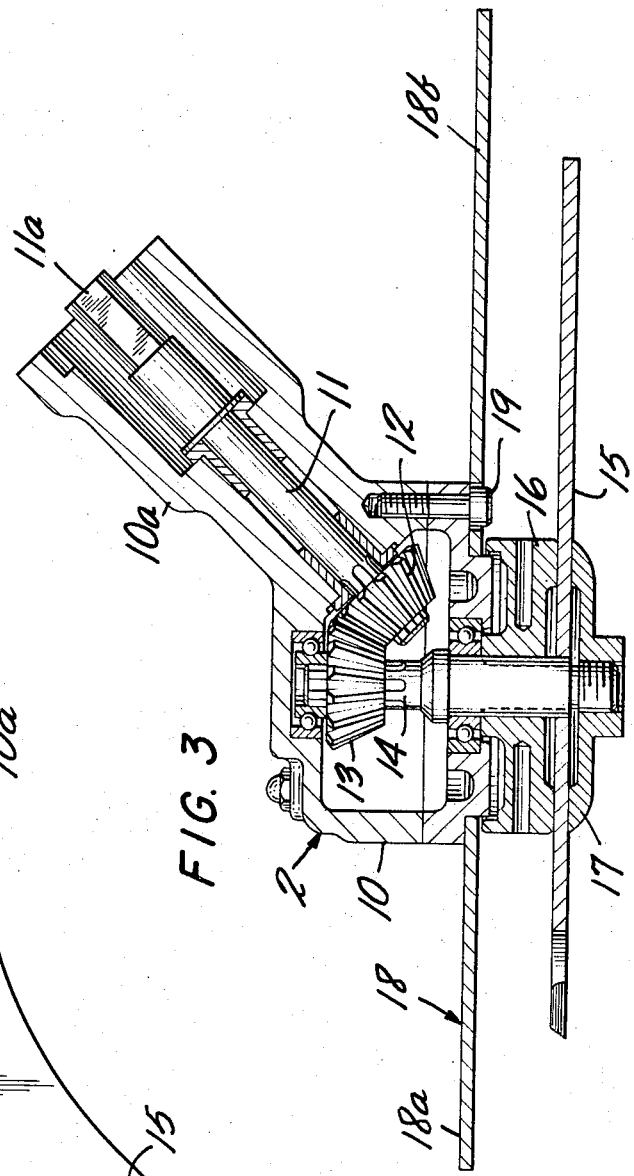

BRUSH CUTTER

This invention relates to brush cutters and in particular to rotary cutter blades for brush cutters.

Brush cutters of the kind to which the present invention relates comprise a power unit, usually a small internal combustion engine, handles for holding and controlling the brush cutter, including in some cases a harness providing at least partial support, a long shaft extending downwardly at an angle from the power unit and driven by the power unit and a cutter or blade mounted at the lower end of the shaft by means of bevelled gears so that the cutter rotates about an approximately vertical axis. Heretofore, brush cutters have used cutter blades similar to the blades of circular saws with a multiplicity of saw teeth around the circumference of the blade.

It is an object of the present invention to provide cutter blades for brush cutters having important advantages over the circular saw type blades heretofore used. In accordance with the invention, there is provided a cutter blade comprising a relatively small number of blade portions for example from three to ten, radiating from a central hub portion and having the following features:

1. The blade portions are symmetrical and have sharpened cutting edges at both sides so that when one set of edges has become dull the blade can be reversed so as to use the other set of cutting edges. Hence, the blade need be resharpened only after both sets of edges are dulled.
2. The cutting edges are in the plane of the upper face of the blade regardless of which side of the blade is being used. With this arrangement the blade is more resistant to being dulled by striking hard objects such as pebbles and stones.
3. The blade has a strong and relatively heavy central support structure for the blades.
4. The blade portions curve smoothly into the central support portion so as to avoid stress concentrations and provide greater strength and longer life.
5. Resharpening of the balde is simpler than with conventional type blades. For example with a blade having three projecting blade portions, only six edges need to be sharpened. The sharpening is readily effected by the use of a simple flat file.
6. The cost of the blade is lower than conventional circular saw type blades beacuse of the simpler configuration and the smaller number of cutting edges to be sharpened.

The improved brush cutter blade in accordance with the present invention will be more fully understood from the following description in conjunction with the accompanying drawings in which:

FIG. 1 is an overall somewhat schematic view of a brush cutter having a cutter blade in accordance with the invention;

FIG. 2 is a partial plan view showing the cutter head of a brush cutter detached from the driving shaft;

FIG. 3 is a section taken on the line 3—3 in FIG. 2;

FIG. 4 is a plan of the cutter blade removed from the head; and

FIG. 5 is a cross section near the tip portion of a blade taken approximately on the line 5—5 in FIG. 4.

A brush cutter shown by way of example in FIG. 1 comprises a power unit 1 and a cutter head 2 mounted at opposite ends of a shaft tube 3. The power unit is, for example, a small internal combustion engine provided with a starter, fuel tank and appropriate accessories. The brush cutter is held and controlled by means of handle bar type handles 4 secured to the shaft tube 3 between the engine and the cutter head. A throttle control on one of the handles is connected to the engine by a flexible cable 5. A harness 6 fastened to the shaft tube 3 at approximately the center gravity of the brush cutter fits over the shoulder of a user to assist in supporting the brush cutter for convenient and comfortable use. A soft annular pad 7 cushions the portion of the shaft tube coming into contact with the user's body. As seen in FIG. 1, the brush cutter is designed to be held in position so that the shaft tube 3 extends downwardly at an angle of approximately 45° from the power unit to the cutter head.

In FIGS. 2 and 3 the cutter head is shown as comprising a casing or body portion 10 having an upwardly inclined projecting portion 10a in which a stub shaft 11 is rotatably mounted. The upper end of the projection portion 10a is formed as a socket designed to be secured on the lower end of the shaft tube 3 and the upper end of the stub shaft 11 is provided with a coupling portion 11a designed to couple with the lower end of the drive shaft (not shown) which extends through the shaft tube 3 from the engine to the cutter head. A bevelled gear 12 on the lower end of the stub shaft 11 meshes with a bevelled gear 13 on the upper end of a spindle 14 rotatably mounted in the body portion 10. A cutter blade 15 is mounted on the lower end of the spindle 14 by being clamped between a spindle head 16 which is mounted on and rotates with the spindle and a drive nut 17 which is screwed onto a threaded end portion of the spindle. A blade guard 18 is secured to the lower side of the housing 10, for example, by machine screws 19. The blade guard 18 is of elongated shape as seen in FIG. 2 with forwardly and rearwardly extending tapered portions which are rounded at the ends. As seen in FIG. 2, the guard 18 is disposed slightly above the cutter blade 15. The forwardly extending portion 18a of the guard projects forwardly approximately to or slightly beyond the tips of the blade portions of the cutter and serves as a guide and supports for the brush, weeds etc. being cut. The rearwardly extending portion 18b of the guard is somewhat longer so as to extend beyond the tip portions of the cutter. When the brush cutter is placed on the ground so as to rest on a supporting portion of the engine and on the rear end of the guard 18, the cutter blade is supported out of contact with the ground.

A cutter blade in accordance with the invention is shown by way of example in FIGS. 4 and 5. The blade 15 comprises a flat plate of steel or other suitable material having a plurality of cutter blade portions 15a radiating outwardly from a central hub portion 15b provided with a central hole 15c of a size to fit over the threaded end of the spindle 14 (FIG. 3). The number of blade portions 15a is relatively small, with a minimum of three blade portions as shown and a maximum of about ten blade portions. A cutter blade having three blade portions is desirable for general use and in particular for cutting heavier brush whereas a cutter having five or seven blade portions may desirably be used for lighter brush and weeds.

The blade portions 15a of the cutter merge smoothly into the central hub portion 15b so as to avoid stress concentrations that might result in breakage of the blade. Moreover the central hub portion 15b is relatively heavy so as to provide a strong supporting structure for the blade portions. For example, the radius of the hub portion as measured from the center of the blade to the nearest part of the re-entrant portions between the blade portions is preferably not less than half the overall radius of the cutter blade. In the cutter blade shown by way of example in FIGS. 4 and 5 of the drawing the cut-outs between successive blade portions are defined by re-entrant arcs having a radius approximately equal to the radius of the cutter blade measured from the center of the hole 15c to the tips of the blade portions.

Cutting edges 15e are provided at opposite sides of each of the blade portions 15a and are symmetrical with respect to a radius of the cutter blade bisecting the respective blade portion. The cutting edges 15e merge smoothly into the re-entrant curves edges 15d but are preferably straight and are inclined at a small angle, for example 10° or 15° to a radius bisecting the respective blade portions so that the opposite cutting edges of the blade converge outwardly toward one another. The outer ends of the cutting edges of each blade are circumferentially spaced from one another and joined by a circumferential edge 15f which is preferably straight. The circumferential length of each of the circumferential edges 15f is preferably between ⅓ and ½ the radius of the cutter blade.

The cutting edges 15e of the blade portions 15a are sharpened by being bevelled. As illustrated in FIG. 5 opposite edges of each blade are bevelled in opposite directions so that one cutting edge is at one face of the blade and the other cutting edge is at the opposite face. Hence, when the blade is rotated in a clockwise direction as illustrated in FIG. 4, the cutting edges at the leading edges of all of the blade portions are located in the plane in the upper face of the blade. This has been found to reduce dulling of the blades by reason of engagement with pebbles or stones.

By reason of the symmetry of the cutter blade as seen in FIG. 4, the blade is reversible. When the leading cutting edges of the blade have become dulled, the blade can be turned over so as to present a fresh set of cutting edges. Because of the opposite inclination of the bevels of the cutting edges as illustrated in FIG. 5, the cutting edges of the blade portions are always in the plane of the upper face of the blade.

The length of the cutting edges of the blade portions is preferably between ¼ and ⅓ of the radius of the cutter as measured from the center to the tips of the blade portions. The configuration of the blade and the simple bevel of the cutting edges permits the edges to be sharpened easily and quickly by means of a flat file. By reason of the small number of cutting edges, the blade can be quickly sharpened.

As an example of a brush cutter blade in accordance with the invention, the blade may have the following characteristics and dimensions:

| | |
|---|---|
| Material of blade | Steel |
| Thickness | 0.125" |
| Number of blade portions | 3 |
| Radius of blade | 5.4" |
| Radius of Re-entrant Arc | 5" |
| Distance from center to bottom arc | 2.5" |
| Length of cutting edges | 1.5" |
| Angle of cutting edges to median radius | 12.5° |
| Length of each circumferential edge | 2" |

The simple shape of the cutter blade and the small number of cutting edges to be sharpened permits the blade to be manufactured easily and economically and to be resharpened quickly and easily. The reversibility of the blade permits longer use between resharpenings. Moreover the downward bevel of the cutting edges has been found to decrease the rate at which the edges are dulled.

By virtue of the novel construction and the features and advantages pointed out above, the brush cutter blades in accordance with the present invention represent an important improvement over blades previously available for such use.

What we claim and desire to secure by Letters Patent is:

1. A brush cutter comprising a cutter blade, means for rotatably mounting said cutter blade and means for rotating said cutter blade in a selected direction, said cutter blade comprising a plate formed to provide a central support portion and a small number of blade portions not less than three and not more than ten radiating from said support portion, each of said blade portions being symmetrical about a radius bisecting said blade portions and having straight cutting edges on opposite sides of each said blade portion, said opposite edges of each of said blade portions converging radially outwardly, and being disposed at a small angle to the median radius of the respective blade portion, opposite edges of said blade portions curving smoothly into said support portion to join the inner ends of the cutting edges of successive blade portions by smooth reentrant curves and thereby avoid stress concentration, said opposite cutting edges being sharpened by being bevelled, all leading cutting edges when said cutter blade is rotated in said selected direction being bevelled in one direction and all trailing cutting edges being bevelled in the opposite direction, said cutter blade being reversibly mounted by said mounting means so that the cutting edge on one side of each blade portion is the leading edge when the cutter blade is mounted in one position and the cutting edge at the opposite side of each blade portion is the leading edge when the cutter blade is mounted in reversed position.

2. A brush cutter according to claim 1, in which the leading cutting edges of all blade portions when said cutter blade is rotated in said direction are bevelled downwardly and rearwardly.

3. A brush cutter according to claim 1, in which the number of blade portions of said cutter blade does not exceed five.

4. A brush cutter according to claim 1, in which each said cutting edge is disposed at an angle of 10° to 15° to the median radius of the respective blade portion.

5. A brush cutter according to claim 1, in which the length of each said cutting edge is between one quarter and one third the radius of said cutter blade.

6. A brush cutter according to claim 1, in which the minimum radius of said support portion is at least one half the overall radius of said cutter blade.

7. A brush cutter according to claim 1, in which said cutter blade has three blade portions and said re-entrant curves approximate circular arcs of a radius approximately equal to the radius of said cutter blade.

8. A brush cutter according to claim 1, in which said cutter blade has three blade portions and the outer ends of the cutting edges of each blade are joined by a peripheral edge having a length between approximately one third and one half the radius of the cutter blade.

* * * * *